W. SMITH.
TROWEL.
APPLICATION FILED AUG. 1, 1916.

1,212,826.

Patented Jan. 16, 1917.

Inventor:—
William Smith.
by his Attorneys.

UNITED STATES PATENT OFFICE.

WILLIAM SMITH, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

TROWEL.

1,212,826.  Specification of Letters Patent.  Patented Jan. 16, 1917.

Application filed August 1, 1916. Serial No. 112,559.

*To all whom it may concern:*

Be it known that I, WILLIAM SMITH, a citizen of the United States, residing in Philadelphia, Pennsylvania, have invented certain Improvements in Trowels, of which the following is a specification.

One object of my invention is to provide a plasterer's trowel with a movable handle so that it can be adjusted in any position along the length of the blade of the trowel for the convenience of the plasterer.

A further object of the invention is to construct the trowel so that the adjustable clamp will not draw the blade of the trowel out of "true," as it is absolutely essential that the blade of a trowel shall be flat in order that the work for which it is intended may be accomplished.

Figure 1:
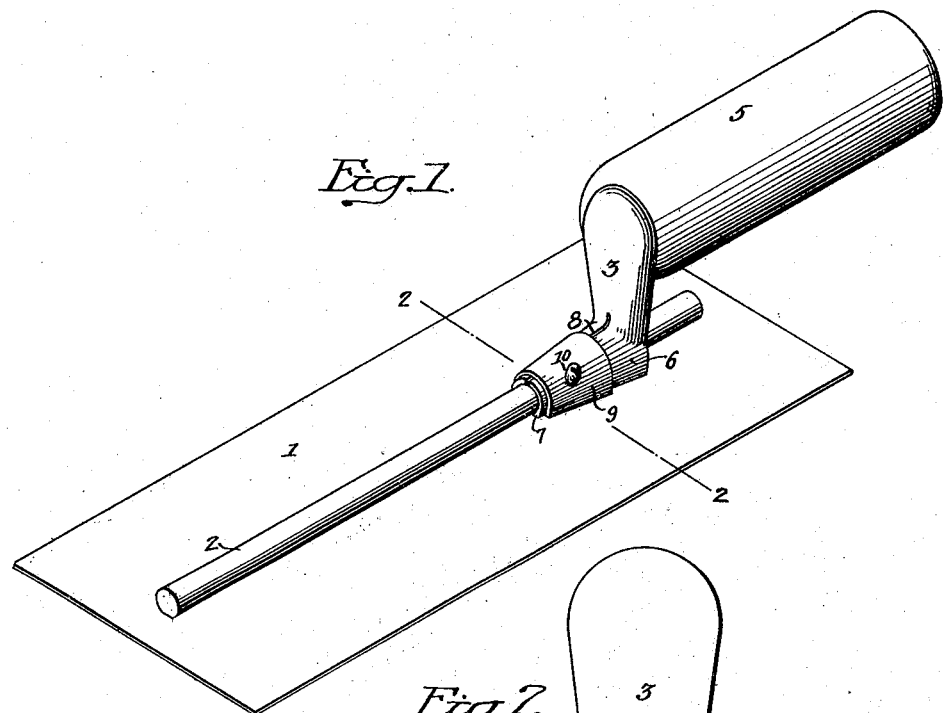
Figure 2:
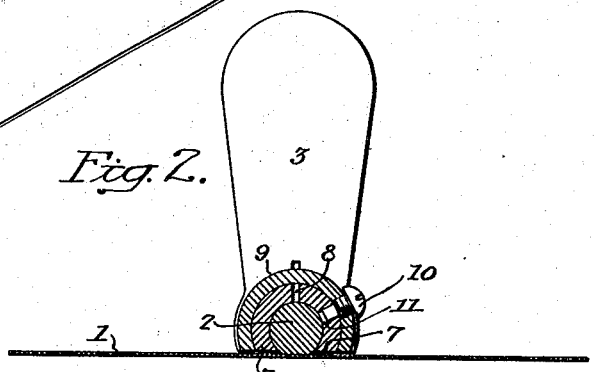
Figure 3:
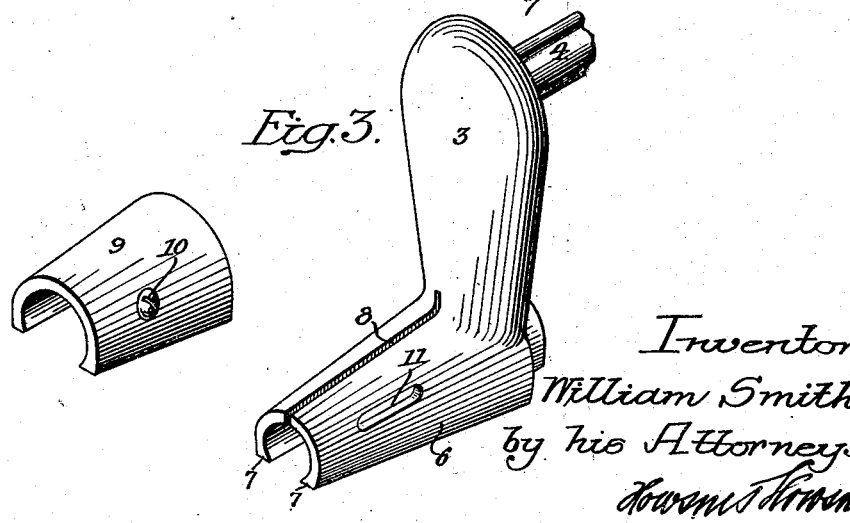

In the accompanying drawing: Figure 1, is a perspective view of my improved trowel adjustably secured in one end of the blade; Fig. 2, is a transverse sectional view on the line 2—2, Fig. 1, and Fig. 3, is a detached perspective view of the metal portion of the handle and the clamping sleeve.

Referring to the drawing, 1 is the blade of the trowel made rectangular in the present instance and secured to the back of this blade is a three-quarter round bar 2. The flat portion of the bar is welded or riveted to the back of the blade. This bar forms an undercut member to which the handle can be secured.

3 is the metallic portion of the handle having a tang 4 on which is mounted the hand hold 5. The metallic portion 3 of the handle is shaped to fit the bar 2 and is tapered as at 6. The edges 7 of the tapered portion of the handle extend past the center of the bar 2 so that when the parts are clamped the handle is firmly held to the bar, and, in any event, it cannot become detached from the bar until the handle is removed from one end of the blade. The tapered portion 6 of the handle is slotted at 8 and a tapered sleeve 9 is adapted to the tapered portion 6. When this sleeve is moved longitudinally it draws the parts of the handle together and on to the bar 2.

In order to limit the movement of the sleeve 9 and to prevent it from becoming detached from the handle, I provide a screw pin 10, which is adapted to a slot 11 in the handle so that when the screw is in position, as in Fig. 2, it limits the movement of the sleeve, preventing it from being withdrawn and misplaced, but allows for the clamping of the handle to the bar in any position desired. The bar 2 may be shaped in cross-section in any desired manner, so as to provide an undercut portion to receive the edges 7 of the handle. By the above arrangement, it will be seen that I can adjust the handle of the trowel in any position along the blade and can readily clamp it by simply sliding the sleeve 9 over the split portion of the handle, the handle being rigidly held to the blade without other fastenings.

I claim:—

1. The combination in a trowel, of a blade; a longitudinally arranged bar centrally located at the back of the trowel and secured thereto, said bar having undercut edges; a handle having a longitudinal extension engaging the bar and split throughout its length so as to form yielding sections, the outer surface of said extension being tapered longitudinally; and a tapered sleeve open at its under side and encircling the tapered portion of the extension of the handle so that when the sleeve is driven onto the tapered portion it will cause the yielding portions of the handle to firmly grasp the bar throughout the length of the extension.

2. The combination in a trowel, of a blade; a bar secured to the back thereof; a handle having a split tapered portion adapted to the bar; a sleeve arranged to move longitudinally on the tapered portion and to contract it so that the handle will be clamped to the bar, said tapered portion being slotted; and a pin on the sleeve extending into the slot to limit the movement of said sleeve.

WILLIAM SMITH.

Copies of this patent may be obtained for five cents each, by addressing the "Commissioner of Patents, Washington, D. C."